(12) United States Patent
Kim (10) Patent No.: US 12,287,222 B2
(45) Date of Patent: Apr. 29, 2025

(54) VEHICLE AND METHOD OF CONTROLLING VEHICLE

(71) Applicants: Hyundai Motor Company, Seoul (KR); Kia Corporation, Seoul (KR)

(72) Inventor: Woo Sung Kim, Jeonju-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 217 days.

(21) Appl. No.: 18/065,063

(22) Filed: Dec. 13, 2022

(65) Prior Publication Data

US 2023/0384112 A1 Nov. 30, 2023

(30) Foreign Application Priority Data

May 26, 2022 (KR) .................. 10-2022-0064435

(51) Int. Cl.
*G01C 21/36* (2006.01)
*G01C 21/34* (2006.01)

(52) U.S. Cl.
CPC ..... *G01C 21/3658* (2013.01); *G01C 21/3461* (2013.01)

(58) Field of Classification Search
CPC .............. G01C 21/3461; G01C 21/3658
See application file for complete search history.

(56) References Cited

U.S. PATENT DOCUMENTS

| 9,891,060 B2* | 2/2018 | Gaither | G01C 21/3676 |
| 10,633,026 B2* | 4/2020 | Takama | B62D 15/0255 |
| 11,538,257 B2* | 12/2022 | Rozploch | G06F 18/22 |
| 2011/0231088 A1* | 9/2011 | Nishibashi | G01C 21/3629 |
| | | | 701/533 |
| 2013/0013189 A1* | 1/2013 | Nishibashi | G09B 29/007 |
| | | | 701/411 |
| 2013/0030691 A1* | 1/2013 | Sumizawa | G09B 29/106 |
| | | | 701/410 |
| 2013/0103304 A1* | 4/2013 | Nishibashi | G08G 1/096827 |
| | | | 701/410 |
| 2013/0110394 A1* | 5/2013 | Irie | G01C 21/3658 |
| | | | 701/461 |
| 2013/0204520 A1* | 8/2013 | Nomura | G01C 21/3658 |
| | | | 701/411 |
| 2014/0032098 A1* | 1/2014 | Anderson | B60N 2/002 |
| | | | 701/428 |

(Continued)

FOREIGN PATENT DOCUMENTS

KR 101304672 B1 9/2013

*Primary Examiner* — Tyler J Lee
(74) *Attorney, Agent, or Firm* — SLATER MATSIL, LLP (57) ABSTRACT

An embodiment vehicle includes a communicator configured to communicate with a server, a sensor, a user interface device, and a controller configured to generate a plurality of routes based on destination information received through the user interface device, wherein the controller is configured to generate a first route not including an exclusive lane from a position of the vehicle to a destination, and in response to information on a maximum occupancy of the vehicle satisfying a first preset condition and information on a number of occupants in the vehicle acquired by the sensor satisfying a second preset condition, generate a second route including the exclusive lane from the position of the vehicle to the destination.

18 Claims, 9 Drawing Sheets

(56) References Cited

U.S. PATENT DOCUMENTS

| | | | | |
|---|---|---|---|---|
| 2016/0307441 | A1* | 10/2016 | Wieskamp | B62D 15/0255 |
| 2017/0284814 | A1* | 10/2017 | Gaither | G01C 21/3658 |
| 2018/0143033 | A1* | 5/2018 | Hu | G01C 21/3617 |
| 2019/0001836 | A1* | 1/2019 | Payne | B60W 20/13 |
| 2019/0180125 | A1* | 6/2019 | Rozploch | G06V 40/166 |
| 2019/0225265 | A1* | 7/2019 | Takama | B62D 6/001 |
| 2020/0202708 | A1* | 6/2020 | Fowe | G08G 1/0133 |
| 2020/0334920 | A1* | 10/2020 | London | G06Q 30/0284 |
| 2022/0415168 | A1* | 12/2022 | Barlow | G08G 1/04 |
| 2023/0342456 | A1* | 10/2023 | Ansari | G06F 21/602 |
| 2023/0415761 | A1* | 12/2023 | Sura | B60W 50/0205 |

* cited by examiner

<PASSENGER CAR>

<VAN>

VEHICLE AND METHOD OF CONTROLLING VEHICLE

CROSS-REFERENCE TO RELATED APPLICATIONS

This application claims the benefit of Korean Patent Application No. 10-2022-0064435, filed on May 26, 2022, which application is hereby incorporated herein by reference.

TECHNICAL FIELD

Embodiments of the present disclosure relate to a vehicle and a method of controlling a vehicle.

BACKGROUND

A vehicle is a type of transportation which may move people, objects, animals, or the like from one position to another position while traveling along a road or a track. Examples of the vehicle may include three-wheel or four-wheel vehicles, two-wheel vehicles such as motorcycles, construction machines, motorized bicycles, bicycles, and trains traveling on a track.

In general, a vehicle is provided with a navigation device configured to search for and provide a route from a current position to a destination.

Recently, as communication technology develops, the navigation device may receive traffic information from a server and generate an optimal route to the destination.

Meanwhile, a vehicle which satisfies conditions prescribed according to laws and regulations may use an exclusive lane, but since the navigation device provides a route according to the conditions set by a user, the vehicle that can use the exclusive lane may also receive only a route not including the exclusive lane.

SUMMARY

Embodiments of the present disclosure relate to a vehicle and a method of controlling a vehicle. Particular embodiments relate to a vehicle configured to provide an optimal route using an exclusive lane when conditions for using the exclusive lane are satisfied and a method of controlling the vehicle.

Therefore, an embodiment of the present disclosure provides a vehicle which may provide an optimal route including an exclusive lane when conditions for using the exclusive lane are satisfied, and a method of controlling the vehicle.

Additional embodiments of the disclosure will be set forth in part in the description which follows and, in part, will be obvious from the description, or may be learned by practice of the disclosure.

In accordance with one embodiment of the present disclosure, a vehicle includes a communicator configured to communicate with a server, a sensor configured to acquire information on the number of occupants in the vehicle, a user interface, and a controller configured to generate a plurality of routes based on destination information received through the user interface, wherein the controller may generate a first route not including an exclusive lane from a position of the vehicle to a destination and generate a second route including the exclusive route from the position of the vehicle to the destination based on the fact that information on the maximum number of occupants in the vehicle satisfies a first preset condition and information on the number of occupants acquired by the sensor satisfies a second preset condition.

In addition, the controller may calculate a first estimated time of arrival according to the first route and a second estimated time of arrival according to the second route based on traffic information received from the server.

In addition, the controller may control the user interface to provide the first route when the first estimated time of arrival is earlier than the second estimated time of arrival and control the user interface to provide the second route when the second estimated time of arrival is earlier than the first estimated time of arrival.

In addition, the controller may control the user interface to provide an interface configured to select the first route or the second route.

In addition, the interface may include estimated time of arrival information according to the first route and estimated time of arrival information according to the second route.

In addition, the controller may control the communicator to transmit identification information of the vehicle to the server, and the communicator may receive the information on the maximum number of occupants in the vehicle transmitted by the server in response to receiving the identification information.

In addition, the sensor may include at least one of a seating sensor, a seat belt sensor, a radar sensor, an ultrasonic sensor, and a camera.

In addition, the exclusive lane may be prescribed to be used only when the maximum number of occupants in the vehicle is greater than or equal to a first standard number of occupants and the number of occupants in the vehicle is greater than or equal to a second standard number of occupants according to laws and regulations.

In addition, the controller may determine that the first preset condition is satisfied when the maximum number of occupants in the vehicle is greater than or equal to the first standard number of occupants and determine that the second preset condition is satisfied when the number of occupants in the vehicle is greater than or equal to the second standard number of occupants.

In addition, the controller may control the user interface to display a visual indicator configured to select the second route based on the fact that the information on the maximum number of occupants satisfies the first preset condition and the information on the number of occupants does not satisfy the second preset condition.

In accordance with another embodiment of the present disclosure, a method of controlling a vehicle includes acquiring information on the maximum number of occupants in the vehicle, acquiring information on the number of occupants in the vehicle, and generating a plurality of routes based on destination information, wherein the generating of the plurality of routes may include generating a first route not including an exclusive lane from a position of the vehicle to a destination, and generating a second route including the exclusive lane from the position of the vehicle to the destination based on the fact that the information on the maximum number of occupants in the vehicle satisfies a first preset condition and the information on the number of occupants in the vehicle satisfies a second preset condition.

In addition, the method of controlling the vehicle may further include calculating a first estimated time of arrival according to the first route and a second estimated time of arrival according to the second route based on traffic information.

In addition, the method of controlling the vehicle may further include providing the first route based on the first estimated time of arrival being earlier than the second estimated time of arrival and providing the second route based on the second estimated time of arrival being earlier than the first estimated time of arrival.

In addition, the method of controlling the vehicle may further include providing an interface configured to select the first route or the second route.

In addition, the interface may include estimated time of arrival information according to the first route and estimated time of arrival information according to the second route.

In addition, the acquiring of the information on the maximum number of occupants in the vehicle may include transmitting identification information of the vehicle to a server and receiving the information on the maximum number of occupants in the vehicle transmitted by the server in response to receiving the identification information.

In addition, the acquiring of the information on the number of occupants in the vehicle may be performed using at least one of a seating sensor, a seat belt sensor, a radar sensor, an ultrasonic sensor, and a camera provided in the vehicle.

In addition, the exclusive lane may be prescribed to be used only when the maximum number of occupants in the vehicle is greater than or equal to a first standard number of occupants and the number of occupants in the vehicle is greater than or equal to a second standard number of occupants according to laws and regulations.

In addition, the method of controlling the vehicle may further include determining that the first preset condition is satisfied when the maximum number of occupants in the vehicle is greater than or equal to the first standard number of occupants and determining that the second preset condition is satisfied when the number of occupants in the vehicle is greater than or equal to the second standard number of occupants.

In addition, the method of controlling the vehicle may further include displaying a visual indicator configured to select the second route based on the fact that the information on the maximum number of occupants satisfies the first preset condition and the information on the number of occupants does not satisfy the second preset condition.

BRIEF DESCRIPTION OF THE DRAWINGS

These and/or other embodiments of the disclosure will become apparent and more readily appreciated from the following description of exemplary embodiments, taken in conjunction with the accompanying drawings, in which.

DETAILED DESCRIPTION OF ILLUSTRATIVE EMBODIMENTS

Advantages and features of embodiments of the present invention and an apparatus and method for achieving them will be made clear from exemplary embodiments described below with reference to the accompanying drawings. However, the disclosure is not limited to the embodiments disclosed below but will be implemented in various different forms, and only the disclosed embodiments are provided so that the disclosure of the disclosure will be thorough and complete and will fully convey the scope of the present invention to those skilled in the art to which the present invention pertains, and the present invention is defined by the scope of the claims.

Terms used in the disclosed embodiments will be briefly described, and the embodiments will be described in detail.

The terms used in the disclosed embodiments have been selected as currently widely used general terms to the extent possible while considering the functions in the disclosed embodiments, but this may vary depending on the intention of those skilled in the art, cases, the emergence of new technology, or the like. In addition, in a specific case, there is a term arbitrarily selected by the applicant, and in this case, the meaning will be described in detail in the description of the corresponding disclosure. Therefore, the terms used in the disclosed embodiments should be defined based on the meaning of the term and the contents throughout the disclosed embodiments, rather than the name of a simple term.

Throughout the specification, when a certain portion is described as "including" a certain component, it means that other components may be further included rather than precluding other components unless otherwise stated. In addition, the term "unit" used in the specification refers to a hardware component such as software, a FPGA, or an ASIC, and the "unit" performs certain roles. However, the "unit" is not meant to be limited to software or hardware. The "unit" may also be configured to reside on an addressable storage medium and may also be configured to reproduce one or more processors. Therefore, as one example, the "unit" refers to components such as software components, object-oriented software components, class components, and task components, processes, functions, attributes, procedures, subroutines, segments of program code, drivers, firmware, microcodes, circuits, data, databases, data structures, tables, arrays, and variables. The functionality provided within components and "units" may be coupled by a smaller number of components and "units" or further divided into additional components and "units".

The signs attached to each operation are used to identify each operation, and these signs do not indicate the order between the operations, and each operation may be performed differently from the stated order unless the context clearly indicates a specific order.

Hereinafter, embodiments of a vehicle and a method of controlling the vehicle will be described in detail with reference to the accompanying drawings so as to be easily carried out by those skilled in the art to which the disclosure pertains. In addition, in order to clearly describe the embodiments disclosed in the drawings, portions not related to the description will be omitted. In addition, in the drawings, the same reference numerals denote the same components, and overlapping descriptions thereof will be omitted.

In embodiments of the present disclosure, the number of occupants refers to the number of occupants in or aboard the vehicle, and the maximum number of occupants refers to the maximum number of people that can legally board on the vehicle.

Figure 1:
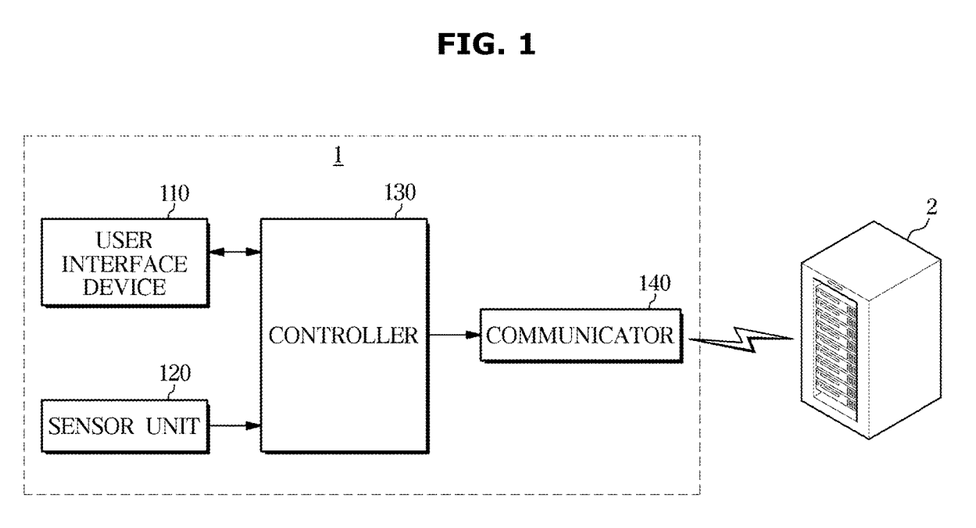
FIG. 1 is a block diagram showing a configuration of a vehicle according to one embodiment.

FIG. 1 is a block diagram showing a configuration of a vehicle according to one embodiment.

Referring to FIG. 1, a vehicle 1 according to one embodiment may include a user interface device 110, a sensor unit 120, a controller 130, and a communicator 140.

The user interface device 110 may include a display configured to display various information on traveling and/or functions of the vehicle 1, an input device configured to receive a user input, and a speaker configured to output various sounds related to the traveling and/or functions of the vehicle 1.

The display may provide the user interface configured to interact between an occupant and the vehicle 1. For example, the display may include a liquid crystal display (LCD) panel and/or a light emitting diode (LED).

The display may provide various information to the user based on a control signal of the controller 130. For example, the display may be provided on a center fascia which is a central area of a dashboard inside the vehicle 1, and the display may also be a component of a head unit and a component of a navigation device provided separately from the head unit.

The head unit may process and output an audio signal and a video signal and may also perform a navigation function. Therefore, the head unit is also referred to as an audio/video/navigation (AVN) device.

The display may display a route guidance screen, that is, a screen required to perform the navigation function. In addition, the display may further display a screen required to perform an audio function, a video function, or a call function.

The speaker may output a sound required to perform the navigation function.

The input device may receive various user inputs for setting functions of the vehicle 1 from the user. For example, the input device may be provided as a tact switch, a joystick, a push switch, a slide switch, a toggle switch, a micro switch, or a touch screen.

According to various embodiments, the input device may include a microphone configured to receive a user's voice input.

According to various embodiments, the user interface device 110 may provide various interfaces configured to provide the navigation function of guiding the vehicle 1 to a destination.

For example, the user may input a destination through the user interface device 110, and the user interface device 110 may provide a route for reaching the destination.

Providing the route for reaching the destination may include providing a guide for allowing the vehicle 1 to travel to the destination.

Although not shown in the drawings, the vehicle 1 may include a global positioning system (GPS) sensor configured to receive GPS information, and the GPS sensor may acquire the GPS information by receiving a signal transmitted from a GPS satellite. In this case, the GPS information may include position information of the vehicle 1, and the GPS sensor may transmit the GPS information of the vehicle 1 to the controller 130.

The sensor unit 120 may acquire information on the number of occupants aboard the vehicle 1.

According to various embodiments, the sensor unit 120 may include at least one of a seating sensor, a seat belt sensor, a radar sensor, an ultrasonic sensor, and a camera. However, any configuration which may detect the number of occupants may be adopted as the sensor unit 120 without limitation.

The seating sensor may acquire seating information of the occupant. The seating sensor may refer to any sensor which may detect a state in which the occupant is seated in a driver seat, an occupant seat, and/or a rear seat. For example, the seating sensor may include a pressure sensor provided in the driver seat, the occupant seat, and/or the rear seat, but the present disclosure is not limited thereto.

The seating sensor may transmit the seating information of the occupant to the controller 130, and the controller 130 may determine the number of occupants aboard the vehicle 1 based on the number of occupied seats.

The seat belt sensor may acquire information on whether the user wears the seat belt. The seat belt sensor may refer to any type of sensor which may detect whether the user has coupled the seat belt to a buckle.

The seat belt sensor may transmit the information on whether the user wears the seat belt to the controller 130, and the controller 130 may determine the number of occupants aboard the vehicle 1 based on the number of seats to which the seat belt is fastened.

The radar sensor may have a detection area inside the vehicle 1, irradiate a radar signal for scanning the detection area, and identify an object inside the vehicle 1 through changes in intensity, frequency, phase, and the like of a reflected signal.

According to various embodiments, the radar sensor may measure biosignals (e.g., respiration, heart rate, respiration change rate, heart rate change rate, pulse, and the like) by confirming a Doppler effect and phase change caused by the movement of an object using a signal received from the detected object.

Therefore, the radar sensor may identify whether the object detected inside the vehicle 1 is a living organism.

Here, since the living organisms have unique biosignal values according to species, age, and the like, it is possible to estimate the species and age of the living organisms as well as whether the living organisms are present using the unique biosignal values. More specifically, when a classification algorithm using a range of eigenvalues of the living organisms is applied, even humans and animals may be distinguished. In addition to the biosignals, sizes and movement may be used as features. Furthermore, it is also possible to estimate the age through the change of the eigenvalue according to the age.

The radar sensor may be adopted as a radar sensor used in a rear occupancy alert (ROA) system, but the present disclosure is not limited thereto.

The radar sensor may transmit information on the number of living organisms detected inside the vehicle 1 to the controller 130, and the controller 130 may determine the number of occupants aboard the vehicle 1 based on the number of living organisms.

The ultrasonic sensor may have a detection area inside the vehicle 1, irradiate an ultrasonic signal for scanning the detection area, and identify an object inside the vehicle 1 through changes in intensity, frequency, phase, and the like of a reflected signal.

The ultrasonic sensor may transmit information on the object detected inside the vehicle 1 to the controller 130, and the controller 130 may determine the number of occupants aboard the vehicle 1 based on the information on the object detected inside the vehicle 1.

The camera may have a capturing area directed the inside of the vehicle 1 and acquire an image inside the vehicle 1.

The camera may transmit the image inside the vehicle 1 to the controller 130, and the controller 130 may determine the number of occupants based on the processing of the image inside the vehicle 1.

As described above, the sensor unit 120 may acquire information on the number of occupants, and the controller 130 may receive the information on the number of occupants acquired by the sensor unit 120.

The controller 130 may include at least one memory in which a program for performing the above-described operation and an operation to be described below is stored and at least one processor configured to execute the stored program. The memory and the processor included in the controller 130 may be integrated into one chip and may also be physically separated.

The memory included in the controller 130 may store map information. Therefore, the controller 130 may generate various routes from a position of the vehicle 1 to the destination based on the map information.

The communicator 140 may include a long-range communication module and/or a short-range communication module configured to exchange data with an external device (e.g., the server 2 or a user terminal).

For example, the communicator 140 may refer to a communication module which may perform wireless Internet communication such as a wireless LAN (WLAN), a wireless broadband (Wibro), Wi-Fi, a world interoperability for microwave access (WiMAX), or a high speed downlink packet access (HSDPA).

The communicator 140 may transmit various information to the server 2 based on the control signal of the controller 130 and receive various information from the server 2.

The server 2 may include a traffic information management server 2. The traffic information management server 2 may provide real-time traffic information to the vehicle 1 by acquiring the real-time traffic information from infrastructure installed nationwide. The real-time traffic information may include information on traffic situations of roads.

For example, the real-time traffic information may include traffic information on general lanes which all vehicles 1 may use and/or traffic information on exclusive lanes which only vehicles 1 satisfying a preset condition according to laws and regulations may use.

According to various examples, the exclusive lane may be a road prescribed to be used only when the maximum number of occupants in the vehicle 1 is greater than or equal to a first standard number of occupants and the number of occupants is greater than or equal to a second standard number of occupants according to laws and regulations. In this case, the first standard number of occupants is greater than the second standard number of occupants.

According to the laws and regulations in Korea, the first standard number of occupants is prescribed as 9 and the second standard number of occupants is prescribed as 6, but the first standard number of occupants and the second standard number of occupants may be changed depending on changes in the laws and regulations and/or countries to which the laws and regulations are applied.

According to various embodiments, the server 2 may include a database for storing vehicle information.

The database for storing the vehicle information may store information on the type of vehicle matching vehicle identification information and/or information on the maximum number of occupants in the vehicle.

The vehicle identification information may include a vehicle identification number (VIN).

In FIG. 1, the user interface device 110, the controller 130, and the communicator 140 are separately shown, but the components may be one component of the navigation device and/or the head unit.

The components shown in FIG. 1 may transmit each piece of information by performing controller area network (CAN) communication therebetween and transmit each piece of information by performing wired communication. For example, a communication network including a body network, a multimedia network, a chassis network, and the like may be configured within the vehicle 1 for control of various electrical loads mounted on the vehicle 1 and communication between various electrical loads, and each network separated from one another as described above may be connected by the controller 130 to exchange a CAN communication message with one another.

Various components of the vehicle 1 have been described above, but a new configuration may be added or the described configuration may be omitted within the general technical scope.

For example, the vehicle 1 may be an autonomous vehicle having an autonomous traveling device. The autonomous traveling device may refer to a device configured to control the steering and speed of the vehicle 1 based on information acquired through a plurality of vehicle sensors (e.g., a camera, a radar, and/or a LiDAR).

When the vehicle 1 corresponds to the autonomous vehicle, the autonomous traveling device may operate the vehicle 1 based on the route generated by the controller 130.

Figure 2:
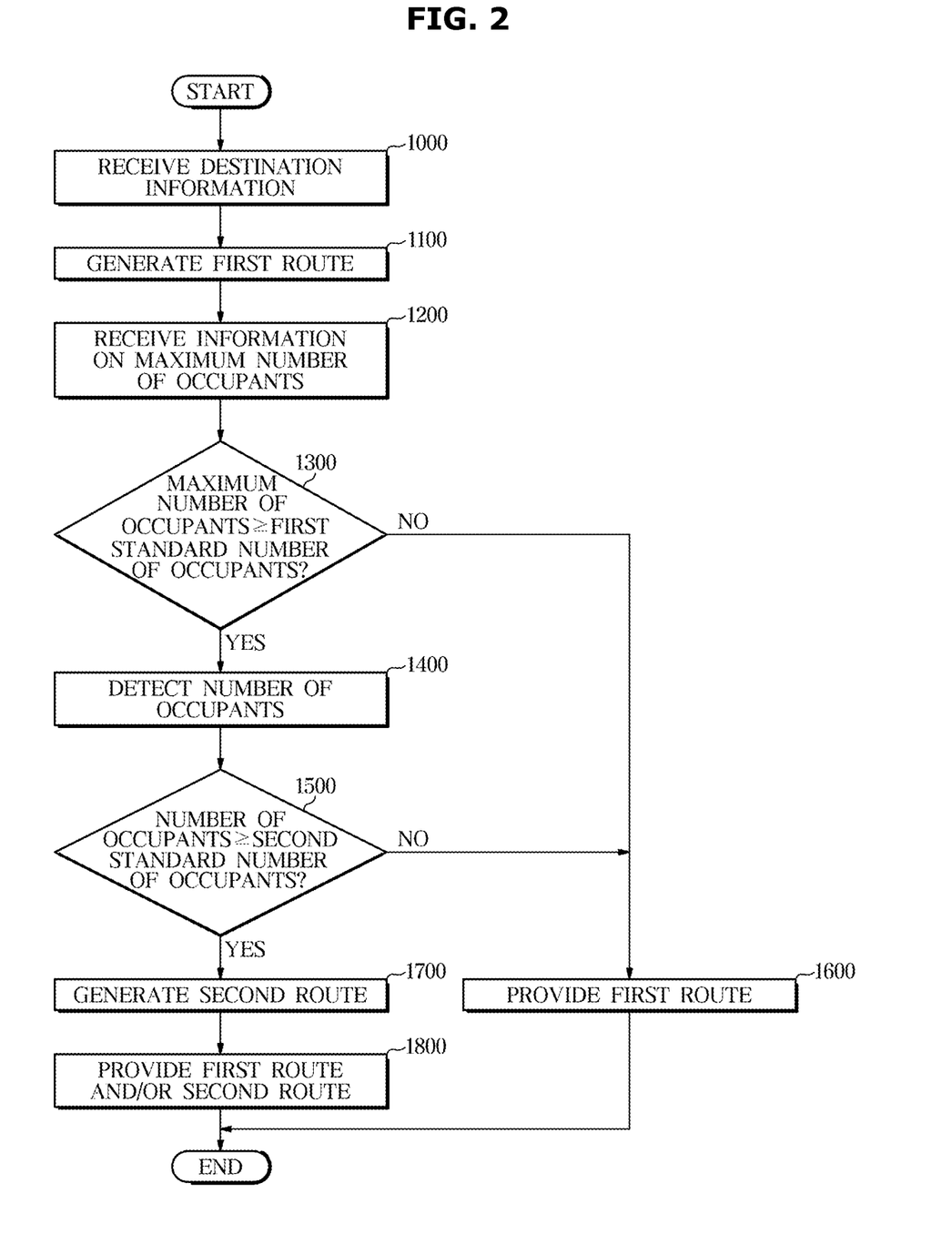
FIG. 2 is a flowchart showing a method of controlling the vehicle according to one embodiment.

FIG. 2 is a flowchart showing a method of controlling a vehicle according to one embodiment.

Referring to FIG. 2, the controller 130 may receive destination information through the user interface device 110.

For example, the user may input the destination through the user interface device no, and the user interface device 110 may transmit the destination information input from the user to the controller 130.

Therefore, the controller 130 may receive the destination information (1000).

Hereinafter, for convenience of description, a route not including the exclusive lane from the position of the vehicle 1 to the destination is referred to as a first route. The route not including the exclusive lane from the position of the vehicle 1 to the destination refers to a route generated assuming that the vehicle 1 does not use the exclusive lane.

In one embodiment, the controller 130 may generate the first route from the position of the vehicle 1 to the destination based on the position information, the destination information, and the traffic information of the vehicle 1 (1100).

For example, the controller 130 may generate at least one first route from the position of the vehicle 1 to the destination based on the destination information and the GPS information and select at least a partial first route satisfying preset conditions among the at least one first route.

The preset conditions may include various conditions such as a distance condition, a fare condition, a time condition, a fuel efficiency condition, or a combination thereof.

According to various embodiments, the controller 130 may generate an optimal first route based on the traffic information received from the server 2. In other words, the controller 130 may select the optimal first route satisfying the preset condition among at least one first route from the position of the vehicle 1 to the destination.

To this end, when the vehicle 1 travels along at least one first route, the controller 130 may calculate an estimated time of arrival to the destination. In other words, the controller 130 may calculate the estimated time of arrival according to the first route based on the traffic situations of the general lane included in the first route. The estimated time of arrival includes the concept of the time required to arrive at the destination.

According to the related art, as long as the user does not change the setting of the navigation function through the user interface, more specifically, as long as the maximum number of occupants in the vehicle is not input, the controller generates only at least one first route not including the exclusive lane from the position of the vehicle to the destination. In addition, according to the related art, a second route including the exclusive lane is provided to the user regardless of the number of occupants in the vehicle according to the setting of the navigation function.

According to embodiments of the present disclosure, the vehicle 1 may determine whether the vehicle 1 may use the exclusive lane without user intervention and generate the second route including the exclusive lane from the position of the vehicle 1 to the destination.

To this end, the controller 130 may receive information on the maximum number of occupants in the vehicle 1 (1200).

The information on the maximum number of occupants may include model information and/or specification information of the vehicle 1.

Figure 3:
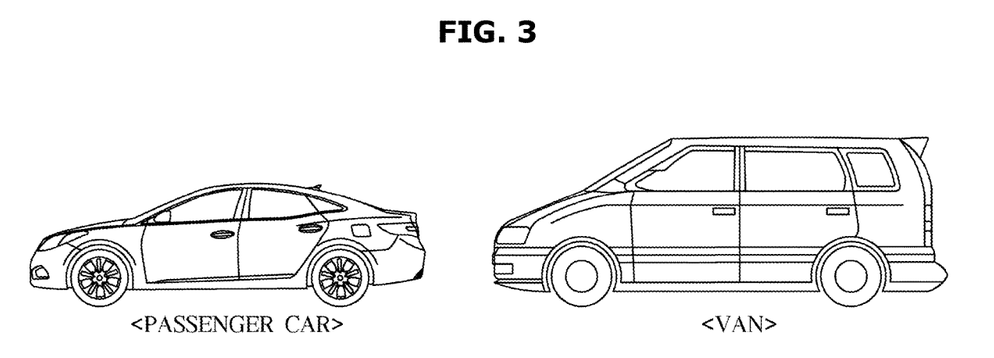
FIG. 3 is a view for describing the type of the vehicle according to one embodiment.

FIG. 3 is a view for describing the type of the vehicle according to one embodiment.

The vehicle 1 may be largely classified into a passenger car and a van, and the passenger car may include a sedan and a sport utility vehicle (SUV). In Korea, the maximum number of occupants in the passenger car is prescribed as 10 or less, and the maximum number of occupants in the van is prescribed as 11 or more according to the laws and regulations.

In addition, according to the laws and regulations, only the van and the passenger car in which the maximum number of occupants is 9 or more may use the exclusive lane. However, the passenger car in which the maximum number of occupants is 9 or more and the van in which the maximum number of occupants is 11 may use the exclusive lane only when the number of occupants actually aboard the vehicle 1 is 6 or more.

In summary, passenger cars and vans in which the maximum number of occupants is 9 or more are eligible to use the exclusive lane, but passenger cars and vans in which the maximum number of occupants is 12 or less may use the exclusive lane only when the number of occupants is 6 or more.

In this case, the exclusive lane refers to a bus-only lane on a highway, but the present disclosure is not limited thereto.

According to various embodiments, the information on the maximum number of occupants may be previously stored in a vehicle control unit. In this case, the controller 130 may receive the information on the maximum number of occupants from the vehicle control unit through the vehicle communication network (e.g., the CAN communication).

On the other hand, when the information on the maximum number of occupants is not stored in the vehicle 1, the vehicle 1 may receive the information on the maximum number of occupants from the server 2.

Figure 4:
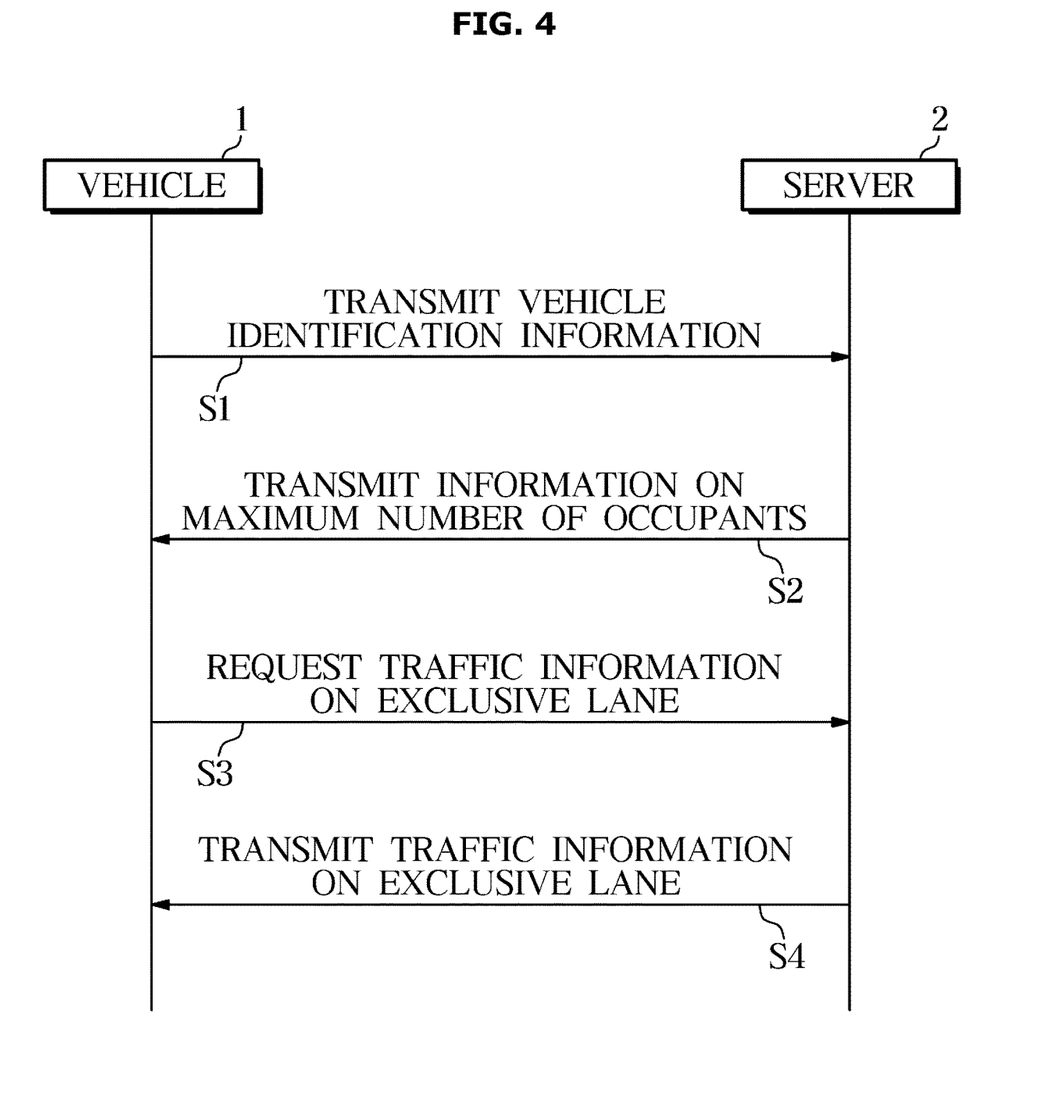
FIG. 4 shows an operation in which the vehicle according to one embodiment receives various information from a server.

FIG. 4 shows an operation in which the vehicle according to one embodiment receives various information from a server.

Referring to FIG. 4, the vehicle 1 according to one embodiment may transmit identification information of the vehicle 1 to the server 2 (S1).

For example, the controller 130 may control the communicator 140 to transmit the identification information of the vehicle 1 to the server 2.

According to various embodiments, the controller 130 may control the communicator 140 to transmit the identification information of the vehicle 1 to the server 2 based on the reception of the user input for setting the destination through the user interface device 110.

As another example, the controller 130 may control the communicator 140 to transmit the identification information of the vehicle 1 to the server 2 based on the start-up of the vehicle 1.

As still another example, the controller 130 may control the communicator 140 to transmit the identification information of the vehicle 1 to the server 2 based on the power-on of the navigation device and/or the head unit.

The server 2 may transmit the information on the maximum number of occupants to the vehicle 1 in response to receiving the identification information from the vehicle 1 (S2).

As described above, the server 2 may include a database for storing the information of the vehicle 1, and the database may store the information on the type of vehicle 1 matching the identification information of the vehicle 1 and/or the information on the maximum number of occupants in the vehicle 1.

The server 2 may identify the information on the maximum number of occupants in the vehicle 1 corresponding to the identification information of the vehicle 1 received from the vehicle 1 based on the database and transmit the identified information on the maximum number of occupants in the vehicle 1 to the vehicle 1.

The controller 130 may control the user interface device 110 to provide the previously generated first route (1600) based on the fact that the maximum number of occupants in the vehicle 1 is smaller than the first standard number of occupants (e.g., 9) (No in 1300).

The controller 130 may determine that the information on the maximum number of occupants in the vehicle 1 received from the server 2 satisfies a first preset condition based on the fact that the maximum number of occupants in the vehicle 1 is greater than or equal to the first standard number of occupants (e.g., 9) (Yes in 1300).

According to various embodiments, the controller 130 may control the sensor unit 120 to acquire the information on the number of occupants in the vehicle 1 based on the fact that the information on the maximum number of occupants in the vehicle 1 satisfies the first preset condition.

For example, the controller 130 may apply power to the sensor unit 120 only when the information on the maximum number of occupants in the vehicle 1 satisfies the first preset condition or control the sensor unit 120 to acquire the information on the number of occupants in the vehicle 1.

However, according to various embodiments, the sensor unit 120 may detect the number of occupants according to various conditions such as starting the vehicle 1, turning on the navigation device, inputting the destination through the user interface device 110, and/or turning on the heat unit, and/or changing a gear of the vehicle 1 to a drive (D) stage.

In other words, based on the satisfaction of the preset condition, the sensor unit 120 may acquire the information on the number of occupants by detecting the number of occupants in the vehicle 1 (1400).

The controller 130 may determine that the information on the number of occupants in the vehicle 1 acquired from the sensor unit 120 satisfies a second preset condition based on that fact that the number of occupants in the vehicle 1 is greater than or equal to the second standard number of occupants (e.g., 6) (Yes in 1500).

The controller 130 may generate the second route including the exclusive lane from the position of the vehicle 1 to the destination (1700) based on the fact that the information on the maximum number of occupants in the vehicle 1 received from the server 2 satisfies the first preset condition (Yes in 1300) and the information on the number of occupants acquired by the sensor unit 120 satisfies the second preset condition (Yes in 1500).

In other words, the controller 130 may generate the second route based on the fact that the maximum number of occupants in the vehicle 1 is greater than or equal to the first standard number of occupants and the number of occupants in the vehicle 1 is greater than or equal to the second standard number of occupants.

The second route including the exclusive lane may be configured as a combination of the general lane and the exclusive lane.

As will be described below, even when the vehicle 1 arrives at the destination through the same highway, using the exclusive lane generally takes a shorter time to arrive than using the general lane.

Referring back to FIG. 4, the vehicle 1 may request the traffic information of the exclusive lane to the server 2 to generate the second route (S3).

More specifically, the controller 130 may control the communicator 140 to request the traffic information of the exclusive lane to the server 2.

According to various embodiments, only when the generation of the second route is required (e.g., only when the information on the number of occupants and the information on the maximum number of occupants satisfy the preset conditions), the controller 130 may control the communicator 140 to request the traffic information of the exclusive lane to the server 2.

The server 2 may transmit the traffic information of the exclusive lane to the vehicle 1 based on the reception of a request signal from the vehicle 1 (S4).

Therefore, the communicator 140 may receive the traffic information of the exclusive lane from the server 2 and transmit the traffic information of the exclusive lane to the controller 130.

The controller 130 may generate at least one second route based on the traffic information of the general lane and the traffic information of the exclusive lane.

In other words, the controller 130 may generate the second route including the exclusive lane from the position of the vehicle 1 to the destination based on the position information, the destination information, and the traffic information of the vehicle 1.

The controller 130 may generate at least one second route from the position of the vehicle 1 to the destination based on the destination information and the GPS information and select at least a partial second route satisfying the preset conditions among the at least one second route.

The preset conditions may include various conditions such as a distance condition, a fare condition, a time condition, a fuel efficiency condition, or a combination thereof.

The fare condition may refer to a condition for an additional fare required to travel along the route such as a toll on a highway.

According to various embodiments, the controller 130 may generate an optimal second route based on the traffic information received from the server 2. In other words, the controller 130 may select the optimal second route satisfying the preset conditions among the at least one second route from the position of the vehicle 1 to the destination.

To this end, when the vehicle 1 travels along at least one second route, the controller 130 may calculate an estimated time of arrival to the destination. In other words, the controller 130 may calculate the scheduled arrival time according to the second route based on the traffic situations of the general lane and the exclusive lane included in the second route. The estimated time of arrival includes the concept of the time required to arrive at the destination.

The controller 130 may control the user interface device 110 to provide the first route and/or the second route based on the generation of both the first route and the second route (1800).

As will be described below, there are various methods in which the user interface device 110 provides the first route and/or the second route, but the method in which the user interface device 110 provides the first route and/or the second route is not limited to an example to be described below.

Figure 5:
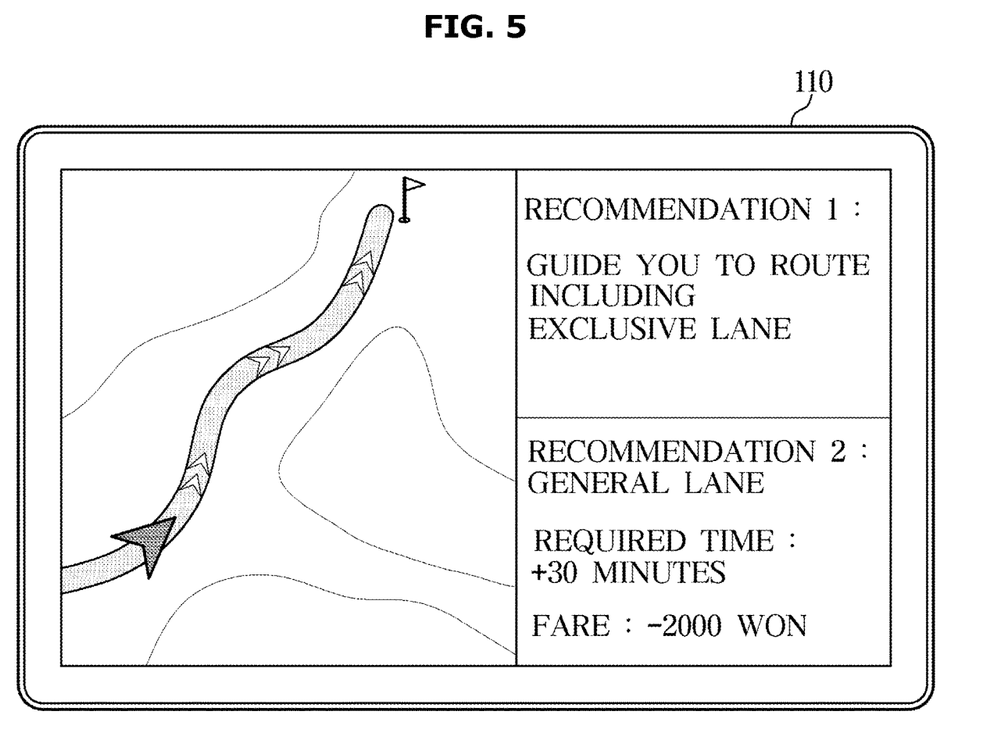
FIG. 5 is a view showing a state in which the vehicle according to one embodiment provides a route including an exclusive lane.

FIG. 5 is a view showing a state in which the vehicle according to one embodiment provides the route including the exclusive lane.

As described above, the controller 130 may calculate an estimated time of arrival according to the first route (hereinafter referred to as a "first estimated time of arrival") and an estimated time of arrival according to the second route (hereinafter referred to as a "second estimated time of arrival") based on the traffic information received from the server 2.

Referring to FIG. 5, the controller 130 may control the user interface device 110 to provide the second route when the second estimated time of arrival is earlier than the first estimated time of arrival.

Providing the second route may include displaying a screen and/or sound for guiding the vehicle 1 according to the second route.

The screen for guiding a traveling route may include TBT information, which refers to direction information such as 11 o'clock direction, 1 o'clock direction, right turn, 5 o'clock direction, U-turn, 8 o'clock direction, left turn, route guidance phrases for guiding a traveling direction, a guide line for guiding a map image and a traveling route with respect to a current position at which the vehicle 1 travels, and the like.

In order to notify a driver that the route including the exclusive lane is provided, the controller 130 may control the user interface device 110 to display a visual display (e.g., phrases) for notifying guiding to the second route.

Meanwhile, the controller 130 may control the user interface device 110 to provide an interface configured to select the first route or the second route.

The interface configured to select the first route or the second route may include information on the estimated time of arrival according to the first route and information on the estimated time of arrival according to the second route.

In addition, the interface configured to select the first route or the second route may include movement distance information according to the first route and movement distance information according to the second route.

In addition, the interface configured to select the first route or the second route may include fare information according to the first route and fare information according to the second route.

According to embodiments of the present disclosure, the user interface device 110 may provide an opportunity to select the first route to the user by providing the interface configured to select the first route while providing the second route.

Meanwhile, the interface configured to select the first route may include information on a time required to increase or decrease the traveling route and/or information on the increased or decreased fare when the traveling route is changed from the second route to the first route.

Figure 6:
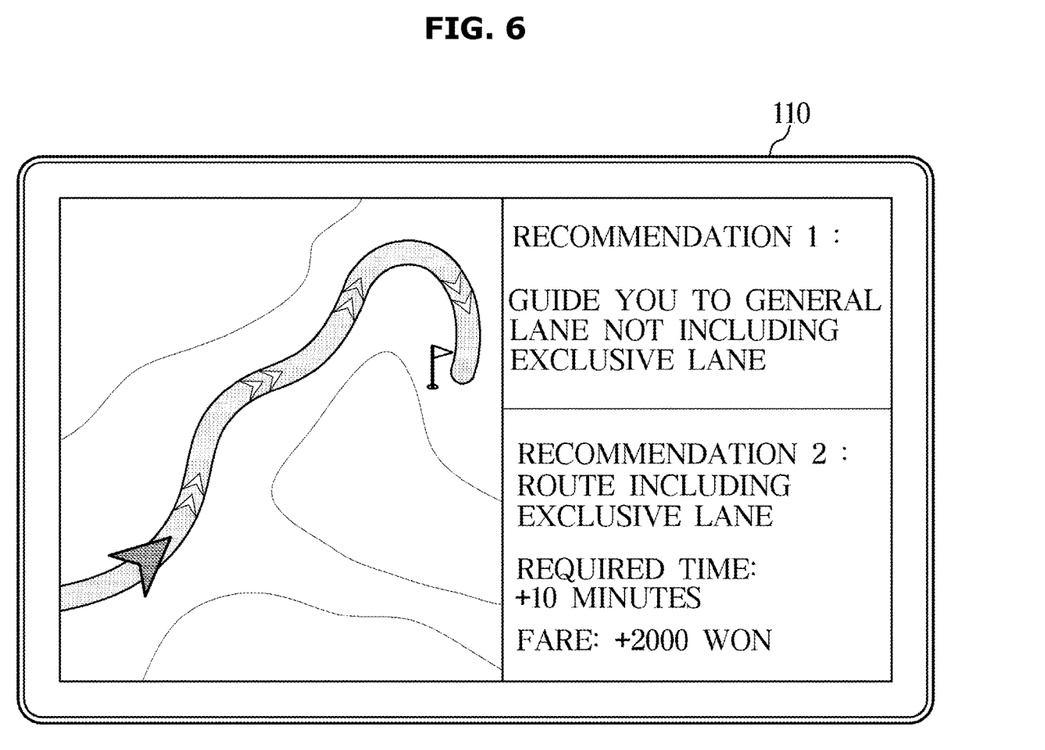
FIG. 6 shows a state in which the vehicle according to one embodiment provides a route not including the exclusive lane.

FIG. 6 shows a state in which the vehicle according to one embodiment provides a route not including the exclusive lane.

Referring to FIG. 6, the controller 130 may control the user interface device 110 to provide the first route when the first estimated time of arrival is earlier than the second estimated time of arrival.

Providing the first route may include displaying a screen and/or sound for guiding the vehicle 1 according to the first route.

In order to notify a driver that the route not including the exclusive lane is provided, the controller 130 may control the user interface device 110 to display a visual display (e.g., phrases) for notifying guiding to the first route.

Meanwhile, the controller 130 may control the user interface device 110 to provide an interface configured to select the first route or the second route.

According to embodiments of the present disclosure, the user interface device 110 may provide an opportunity to select the second route to the user by providing the interface configured to select the second route while providing the first route.

Meanwhile, the interface configured to select the second route may include information on a time required to increase or decrease the traveling path and/or information on the increased or decreased fare when the traveling route is changed from the first route to the second route.

Figure 7:
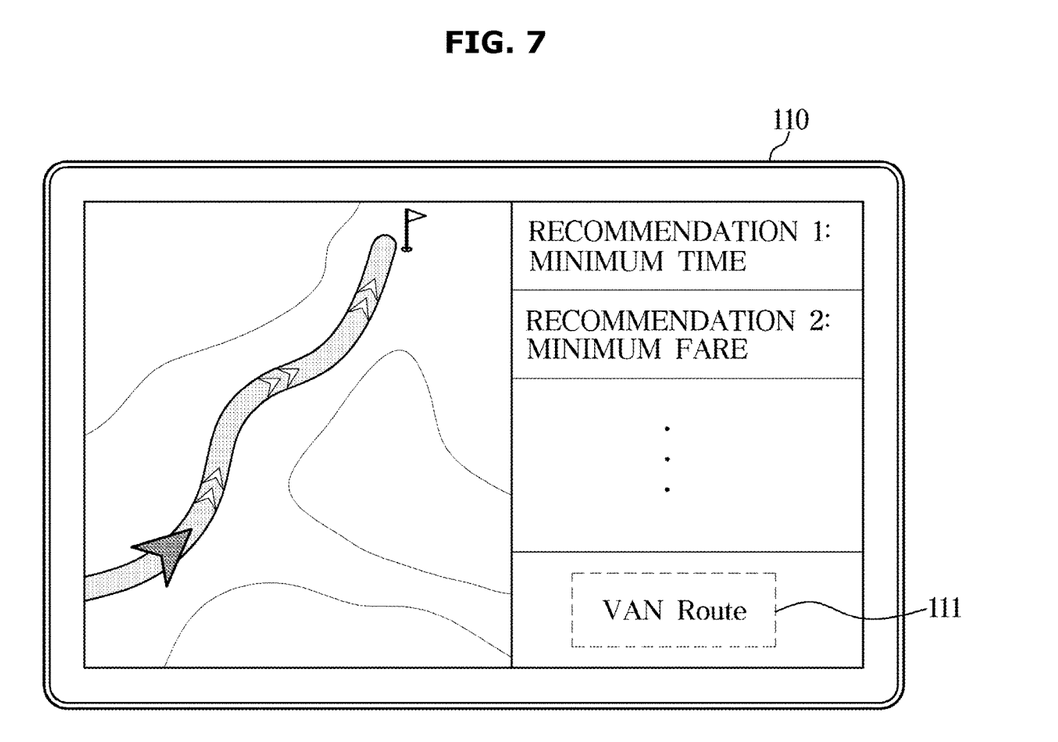
FIG. 7 is a view showing a state in which the vehicle according to one embodiment provides an interface configured to select a route including the exclusive lane.

FIG. 7 is a view showing a state in which the vehicle according to one embodiment provides an interface configured to select the route including the exclusive lane.

Referring to FIG. 7, the controller 130 may provide an interface configured to select any one of a plurality of first routes. In addition, the controller 130 may control the user interface device 110 to display a visual indicator in configured to select at least one second route including the exclusive lane.

Referring back to FIG. 2, the controller 130 may control the user interface device 110 to provide the first route (1600) when the information on the maximum number of occupants in the vehicle 1 does not satisfy the first preset condition (No in 1300) or the information on the number of occupants in the vehicle 1 does not satisfy the second preset condition (No in 1500).

Meanwhile, under a specific condition, the user interface device 110 may ask the user to select the second route by providing the visual indicator in while providing the first route.

The maximum number of occupants corresponds to a value that cannot be changed depending on the vehicle 1.

Therefore, the controller 130 may control the user interface device 110 not to display the visual indicator in when the maximum number of occupants in the vehicle 1 is smaller than the first standard number of occupants.

On the other hand, since the number of occupants corresponds to a value that can change at any time depending on situations, the actual number of occupants and information on the number of occupants acquired by the sensor unit 120 may be different due to a detection error of the sensor unit 120 and the like.

Therefore, the controller 130 may control the user interface device 110 to display the visual indicator in when the maximum number of occupants in the vehicle 1 is greater than or equal to the first standard number of occupants and the number of occupants in the vehicle 1 is smaller than the second standard number of occupants.

In other words, when the information on the maximum number of occupants in the vehicle 1 satisfies the first preset condition, the controller 130 may control the user interface device 110 to display the visual indicator 111 even when the information on the number of occupants in the vehicle 1 does not satisfy the second preset condition.

Meanwhile, the controller 130 may generate the second route based on the selected visual indicator in and control the user interface device 110 to provide the generated second route.

According to embodiments of the present disclosure, it is possible to prevent a problem that the second route is not provided even when the vehicle 1 satisfies the condition for using the exclusive lane.

Figure 8:
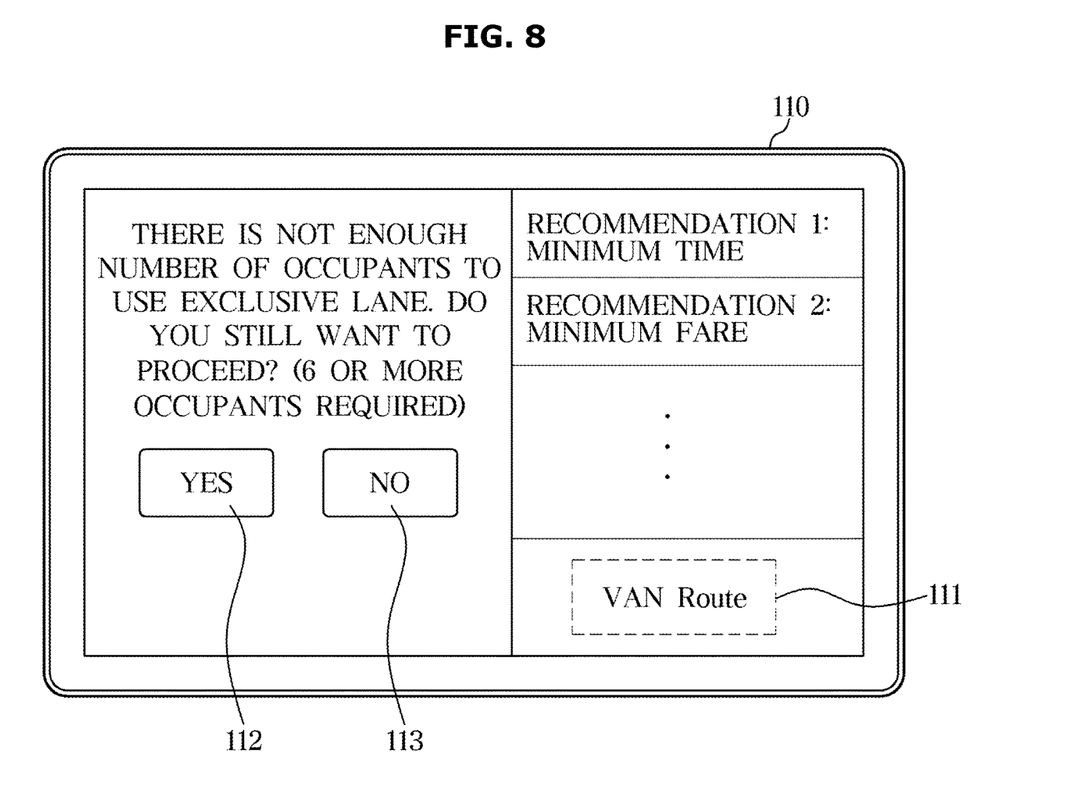
FIG. 8 is a view showing an interface configured to select whether to use the exclusive lane when conditions in which the vehicle according to one embodiment may use the exclusive lane are not satisfied.

FIG. 8 is a view showing an interface configured to select whether to use the exclusive lane when the vehicle 1 according to one embodiment does not satisfy the condition for using the exclusive lane.

Referring to FIG. 8, the controller 130 may control the user interface device 110 to provide the interface configured to select whether to use the exclusive lane based on the selected visual indicator in when the information on the maximum number of occupants in the vehicle 1 satisfies the first preset condition and the information on the number of occupants does not satisfy the second preset condition.

The interface configured to select whether to use the exclusive lane may include an indicator 112 configured to receive the second route and an indicator 113 configured not to receive the second route.

In addition, the interface configured to select whether to use the exclusive lane may include information on the second standard number of occupants.

Therefore, when the number of occupants actually aboard the vehicle 1 is greater than or equal to the second standard number of occupants, the occupant may select the indicator 112 configured to receive the second route.

On the other hand, when the number of occupants actually aboard the vehicle 1 is smaller than the second standard number of occupants, the occupant may select the indicator 113 configured not to receive the second route in order to comply with the laws and regulations.

According to embodiments of the present disclosure, when the maximum number of occupants is greater than or equal to the first standard number of occupants but the number of occupants is smaller than the second standard number of occupants, it is possible to induce the occupant to easily confirm whether to use the exclusive lane by himself/herself by providing the information on the second standard number of occupants to the occupant.

Figure 9:
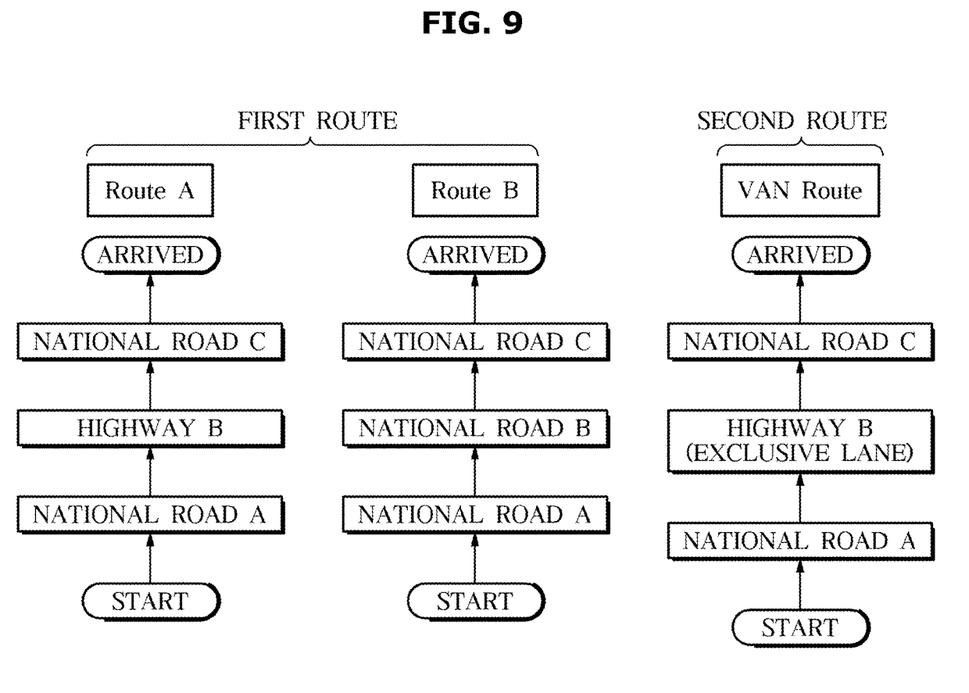
FIG. 9 shows one example of a first route and a second route.

FIG. 9 shows one example of the first route and the second route.

Referring to FIG. 9, at least one first route may include different roads. For example, according to the first route corresponding to "Route A", the vehicle 1 may arrive at a destination via "National road A", "Highway B", and "National road C".

According to the first route corresponding to "Route B", the vehicle 1 may arrive at a destination via "National Road A", "National Road B", and "National Road C".

Meanwhile, according to the second route corresponding to "VAN Route", the vehicle 1 may arrive at a destination via "National Road A", "Highway B", and "National Road C" in the same manner as "Route A".

On the other hand, according to the second route corresponding to "VAN Route", the vehicle 1 may use the exclusive lane on "Highway B", and thus the estimated time of arrival according to the first route corresponding to "Route A" may be later than the estimated time of arrival according to the second route corresponding to "VAN Route".

Meanwhile, the first estimated time of arrival according to the first route corresponding to "Route B" may be earlier or later than the second estimated time of arrival according to the second route corresponding to "VAN Route".

When the first estimated time of arrival is earlier than the second estimated time of arrival, the controller 130 may control the user interface device 110 as shown in FIG. 6, and when the first estimated time of arrival is later than the second estimated time of arrival, the controller 130 may control the user interface device 110 as shown in FIG. 7.

Meanwhile, according to various embodiments, in the case of the autonomous vehicle, the autonomous traveling device may control the vehicle 1 based on the first route or the second route.

According to embodiments of the present disclosure, it is possible to provide an optimal route to a destination to the vehicle 1 for using the exclusive lane.

In addition, according to embodiments of the present disclosure, it is possible to prevent the situation in which the occupant in the vehicle 1 violates the laws and regulations by confirming the number of occupants in the vehicle 1 even when the maximum number of occupants in the vehicle 1 is greater than or equal to the first standard number of occupants.

The examples of the vehicle and the method of controlling the vehicle are not limited thereto, and the embodiments described above are illustrative in all respects. Therefore, those skilled in the art to which the present disclosure pertains will be able to understand that the present disclosure may be carried out in other specific forms without changing the technical spirit or essential characteristics thereof. The scope of the present disclosure is defined by the claims rather than the above-described description, and all differences within its equivalent scope should be construed as being included in the present disclosure.

Meanwhile, the disclosed embodiments may be implemented in the form of a recording medium configured to store instructions executable by a computer. The instructions may be stored in the form of program code, and may generate program modules to perform the operations of the disclosed embodiments when executed by a processor. The recording medium may be implemented as a computer-readable recording medium.

The computer-readable recording medium includes all types of recording mediums in which the instructions readable by the computer are stored. For example, the recording medium may include read only memories (ROMs), random access memories (RAMs), magnetic tapes, magnetic disks, flash memories, optical data storage devices, and the like.

According to embodiments of the present disclosure, a vehicle to use an exclusive lane can provide an optimal route including the exclusive lane.

According to embodiments of the present disclosure, it is possible to prevent an occupant of the vehicle from violating the laws and regulations.

According to embodiments of the present disclosure, the occupant of the vehicle can easily confirm whether to use the exclusive lane.

What is claimed is:

1. A vehicle comprising:
a communicator;
a sensor;
a user interface device implemented as an electronic device that receives user input and outputs information; and
a controller configured to generate a plurality of routes based on destination information received through the user interface device, wherein the controller is further configured to:
generate a first route not including an exclusive lane from a position of the vehicle to a destination; and
in response to information on a maximum occupancy of the vehicle satisfying a first preset condition and information on a number of occupants in the vehicle acquired by the sensor satisfying a second preset condition, generate a second route including the exclusive lane from the position of the vehicle to the destination,
wherein the controller is further configured to control the user interface device to display a visual indicator configured to select the second route based on the information on the maximum occupancy satisfying the first preset condition and the information on the number of occupants not satisfying the second preset condition.

2. The vehicle of claim 1, wherein the controller is configured to calculate a first estimated time of arrival according to the first route and a second estimated time of arrival according to the second route based on traffic information received from a server through the communicator.

3. The vehicle of claim 2, wherein the controller is configured to control the user interface device to provide the first route when the first estimated time of arrival is earlier than the second estimated time of arrival and to control the user interface device to provide the second route when the second estimated time of arrival is earlier than the first estimated time of arrival.

4. The vehicle of claim 1, wherein the controller is configured to control the user interface device to provide an interface for selecting the first route or the second route.

5. The vehicle of claim 4, wherein the interface includes estimated time of arrival information according to the first route and estimated time of arrival information according to the second route.

6. The vehicle of claim 1, wherein:
the controller is configured to control the communicator to transmit identification information of the vehicle to a server; and the communicator is configured to receive the information on the maximum occupancy of the vehicle transmitted by the server in response to receiving the identification information.

7. The vehicle of claim 1, wherein the sensor comprises a seating sensor, a seat belt sensor, a radar sensor, an ultrasonic sensor, or a camera.

8. The vehicle of claim 1, wherein the exclusive lane is prescribed to be used only when the maximum occupancy of the vehicle is greater than or equal to a first standard number of occupants and the number of occupants in the vehicle is greater than or equal to a second standard number of occupants according to laws and regulations.

9. The vehicle of claim 8, wherein the controller is configured to determine that the first preset condition is satisfied when the maximum occupancy of the vehicle is greater than or equal to the first standard number of occupants and to determine that the second preset condition is satisfied when the number of occupants in the vehicle is greater than or equal to the second standard number of occupants.

10. A method of controlling a vehicle, the method comprising:
    acquiring information on a maximum occupancy of the vehicle;
    acquiring information on a number of occupants in the vehicle; and
    generating a plurality of routes based on destination information received through a user interface device of the vehicle, the user interface device being implemented as an electronic device that receives user input and outputs information, wherein generating the plurality of routes comprises:
        generating a first route not including an exclusive lane from a position of the vehicle to a destination;
        in response to the information on the maximum occupancy of the vehicle satisfying a first preset condition and the information on the number of occupants in the vehicle satisfying a second preset condition, generating a second route including the exclusive lane from the position of the vehicle to the destination; and
        controlling the user interface device to display a visual indicator configured to select the second route based on the information on the maximum occupancy satisfying the first preset condition and the information on the number of occupants not satisfying the second preset condition.

11. The method of claim 10, further comprising calculating a first estimated time of arrival according to the first route and a second estimated time of arrival according to the second route based on traffic information.

12. The method of claim 11, further comprising:
    providing the first route based on the first estimated time of arrival being earlier than the second estimated time of arrival; and
    providing the second route based on the second estimated time of arrival being earlier than the first estimated time of arrival.

13. The method of claim 10, further comprising providing an interface for selecting the first route or the second route.

14. The method of claim 13, wherein the interface comprises estimated time of arrival information according to the first route and estimated time of arrival information according to the second route.

15. The method of claim 10, wherein acquiring the information on the maximum occupancy of the vehicle comprises:
    transmitting identification information of the vehicle to a server; and
    receiving the information on the maximum occupancy of the vehicle transmitted by the server in response to receiving the identification information.

16. The method of claim 10, wherein acquiring the information on the number of occupants in the vehicle is performed using a seating sensor, a seat belt sensor, a radar sensor, an ultrasonic sensor, or a camera provided in the vehicle.

17. The method of claim 10, wherein the exclusive lane is prescribed to be used only when the maximum occupancy of the vehicle is greater than or equal to a first standard number of occupants and the number of occupants in the vehicle is greater than or equal to a second standard number of occupants according to laws and regulations.

18. The method of claim 17, further comprising:
    determining that the first preset condition is satisfied when the maximum occupancy of the vehicle is greater than or equal to the first standard number of occupants; and
    determining that the second preset condition is satisfied when the number of occupants in the vehicle is greater than or equal to the second standard number of occupants.

* * * * *